/

US006948099B1

(12) United States Patent
Tallam

(10) Patent No.: US 6,948,099 B1
(45) Date of Patent: Sep. 20, 2005

(54) RE-LOADING OPERATING SYSTEMS

(75) Inventor: Madhukar Tallam, Fremont, CA (US)

(73) Assignee: Intel Corporation, Santa Clara, CA (US)

( * ) Notice: Subject to any disclaimer, the term of this patent is extended or adjusted under 35 U.S.C. 154(b) by 709 days.

(21) Appl. No.: 09/365,093

(22) Filed: Jul. 30, 1999

(51) Int. Cl.[7] .............................................. G06F 11/00
(52) U.S. Cl. ........................................... 714/38; 714/3
(58) Field of Search ......................... 714/6, 3, 24, 21, 714/23, 38

(56) References Cited

U.S. PATENT DOCUMENTS

| | | | | |
|---|---|---|---|---|
| 5,136,711 A | * | 8/1992 | Hugard et al. ................ 710/74 |
| 5,142,680 A | * | 8/1992 | Ottman et al. ............... 709/217 |
| 5,469,573 A | * | 11/1995 | McGill et al. ............... 707/200 |
| 5,627,964 A | * | 5/1997 | Reynolds et al. ............. 714/46 |
| 5,715,462 A | * | 2/1998 | Iwamoto et al. ............ 707/200 |
| 5,742,829 A | * | 4/1998 | Davis et al. ................. 717/178 |
| 5,784,549 A | | 7/1998 | Reynolds et al. ...... 395/182.22 |
| 5,793,943 A | | 8/1998 | Noll ....................... 395/182.04 |
| 5,794,054 A | | 8/1998 | Le et al. |
| 5,805,882 A | * | 9/1998 | Cooper et al. ............... 711/166 |
| 5,870,520 A | * | 2/1999 | Lee et al. ....................... 714/6 |
| 5,905,888 A | * | 5/1999 | Jones et al. .................... 710/13 |
| 6,016,553 A | * | 1/2000 | Schneider et al. ............. 714/21 |
| 6,018,806 A | * | 1/2000 | Cortopassi et al. ............. 714/6 |
| 6,079,033 A | * | 6/2000 | Jacobson et al. ............... 714/4 |
| 6,151,674 A | * | 11/2000 | Takatani ..................... 709/222 |
| 6,167,532 A | * | 12/2000 | Wisecup ..................... 714/23 |
| 6,170,055 B1 | * | 1/2001 | Meyer et al. ................... 713/2 |
| 6,195,695 B1 | * | 2/2001 | Cheston et al. ............. 707/200 |
| 6,205,527 B1 | * | 3/2001 | Goshey et al. ............. 711/162 |
| 6,308,265 B1 | * | 10/2001 | Miller ........................ 710/10 |
| 6,314,532 B1 | * | 11/2001 | Daudelin et al. ............. 714/23 |
| 6,317,879 B1 | * | 11/2001 | Jacobson et al. ........... 717/127 |
| 6,393,585 B1 | * | 5/2002 | Houha et al. ................ 709/221 |

FOREIGN PATENT DOCUMENTS

| | | | |
|---|---|---|---|
| EP | 0 917 060 A1 | 5/1999 | |
| WO | WO-95/22794 | * 8/1995 | ........... G06F/11/14 |
| WO | WO 95/227494 | 8/1995 | |

OTHER PUBLICATIONS

"When You Should Not Run the Rescue Program from the Rescue Disk", Feb. 12, 1997, Symantec Corp., <http://service2.symantec.com/SUPPORT/nunt.nsf/pfdocs/199721295740>{Jun. 7, 2002}.*
"How to Restore Windows 95 Registry Files with Rescue" Jul. 19, 1996, Symantec Corp., <http://service2.symantec.com/SUPPORT/nunt.nsf/pfdocs/199671915446>{Jun. 7, 2002}.*
"Does the Rescue Disk Save the Windows 95 Registry Files?", Jul. 22, 1996, Symantec Corp., <http://service2.symantec.com/SUPPORT/nunt.nsf/pfdocs/1996722162727>{Jun. 7, 2002}.*
Bachle, Ralf, Linux/MIPS Ticker, Jan. 26, 1997 <http://lena.fnet.fr/linux-mips-news.html>[Accessed Feb. 13, 2002].*
"Method to Recover from Failed Boot Drive Using Diskettes", Oct. 1, 1993, IBM Technical Disclosure Bulletin, Oct. 1993, US, vol. 36, iss. 10, pp. 329–330.*

(Continued)

Primary Examiner—Robert Beausoliel
Assistant Examiner—Gabriel Chu
(74) Attorney, Agent, or Firm—Trop, Pruner & Hu, P.C.

(57) ABSTRACT

An operating system may be stored in a reprogrammable memory. The memory may store a primary operating system and recovery operating system. The recovery operating system may automatically obtain a new operating system to replace a corrupted or outdated operating system. In some embodiments, this avoids the need to call upon the user to load the new operating system through a disk drive and to undertake a time consuming installation procedure.

8 Claims, 4 Drawing Sheets

OTHER PUBLICATIONS

Berkes, Dan, "Boost Your Penguin Power", Nov. 11, 1999, PCWorld.com, <http://www.pcworld.com/resource/printable/0,aid,13702,00.asp>[Accessed Feb. 13, 2002].*

"Troubleshooting Windows 95 Using Safe Mode (Q156126)"Sep. 18, 1996, Microsoft Corporation <http://support.microsoft.com/default.aspx?scid=kb;E-N-US;q156126>[Apr. 22, 2002].*

"How to Reinstall Windows 95 to a New Folder (Q142096)" Jan. 5, 1996, Microsoft Corporation <http://support.microsoft.com/default.aspx?scid=kb;en-us;Q142096>[Apr. 22, 2002].*

Charles A. Anyimi, *Implementing A Plug And Play Bios Using Intel's Boot Block Flash Memory*, Intel AP–608 Application Note, pp. 1–29 (Feb. 1995).

* cited by examiner

RE-LOADING OPERATING SYSTEMS

BACKGROUND

This invention relates generally to operating systems used to control computer systems.

The basic input/output system (BIOS) is a set of software routines that test hardware setup, start the operating system, and support the transfer of data among hardware devices. BIOS is stored in a memory so that it can be executed when the computer is turned on. The BIOS uses the CMOS setup utility, accessible at boot time, for setting up certain system options such as the date and time, the kind of drives and the port configuration.

When the microprocessor is turned on or reset, it begins at a special memory location near the top of a real mode addressing range. This location holds a special program instruction called the boot code—a jump vector that points to another address where the BIOS code actually begins. The BIOS instructs the microprocessor to run through all the known components of the system and to determine whether they are operating properly. The microprocessor then begins the actual boot-up process. The BIOS code instructs the microprocessor to jump to a section of code to read the first sector of the storage medium such as a hard disk drive that contains start-up information. The program code then takes over from the BIOS and instructs the microprocessor how to load the operating system, usually from a hard disk drive, to start the computer.

An operating system is software that controls the allocation and usage of hardware resources such as memory, central processing unit time and peripheral devices. Some well known operating systems include the Windows® 98, Windows® CE, Windows® NT, MAC OS, UNIX, LINUX and BE operating systems.

With any operating system, problems may arise. During the boot process, it may be determined that the operating system, as stored, is corrupted. In such cases, it is normally necessary to undertake a time consuming procedure to re-load the operating system from a disk provided by the computer system manufacturer.

In addition, the operating system provider may provide fixes or improvements collectively termed "updates" herein. Periodically, updates become available. Normally, these updates may be acquired for download or for reading from a disk from the operating system provider.

Thus, there is a continuing need for better ways to re-load an operating system due to operating system corruption or the availability of updates.

SUMMARY

In accordance with one aspect, a method of recovering a primary operating system responsible for operating a processor-based device, includes providing a recovery operating system for the device. The device is operated using the recovery operating system when it is desired to recover the primary operating system. Primary operating system code is obtained for recovering the primary operating system using the recovery operating system.

DETAILED DESCRIPTION

Figure 1:
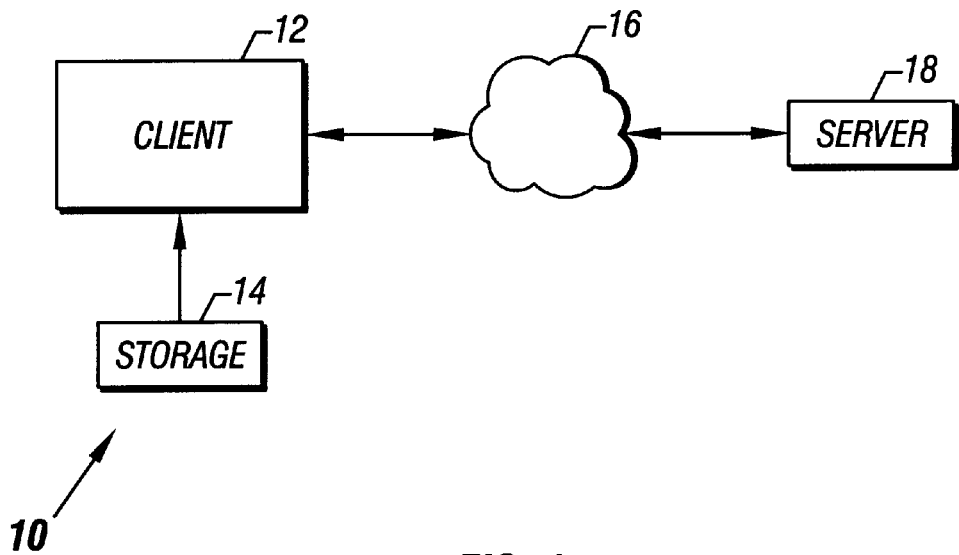
FIG. 1 is a schematic depiction of a client/server system in accordance with one embodiment of the present invention.

A client/server computer system 10, shown in FIG. 1, may include one or more servers 18 that may be coupled over a network 16 to one or more clients 12. Each client 12 may have a storage device 14. The client 12 may be a processor-based system such as a desktop computer system, a handheld computer system, a processor-based television system, a set top box, an appliance, a thin client, a cellular telephone, or the like. The network 16 may be any of a variety of networks including a local area network (LAN), a metropolitan area network (MAN), a wide area network (WAN), a wireless network, a home network or an internetwork such as the Internet.

In the system 10, the client 12 may permanently store its operating system on a re-programmable storage device 14. The storage device 14 may conventionally be a hard disk drive or a FLASH memory. When the operating system is corrupted or needs updating, the client 10 can access the network 16 and the server 18 in order to obtain an uncorrupted or updated operating system and automatically re-load the new operating system onto the storage device 14.

The storage device 14 may be electrically reprogrammed. The storage device 14 may also act as the BIOS memory for the client 12 in one embodiment of the invention. While conventionally the BIOS memory is a read only memory (ROM), by using a re-programmable memory, the operating system as well as the BIOS code may be updated or replaced when corrupted, as will be explained hereinafter. In other embodiments a conventional BIOS ROM may be used in addition to the storage device 14.

A variety of FLASH memories are available for implementing the storage device 14, such as Intel's "StrataFlash" brand memory. One advantageous memory is the 28F64OJ5 eight megabyte FLASH array available from Intel Corporation. This memory includes a plurality of 128 kilobyte blocks. Each block may be data protected so that it may not be erased or overwritten. In other words, data protection may be selectively applied to one or more of a plurality of blocks in the memory.

The BIOS may be stored in one or more data protected blocks in the FLASH memory. Likewise, the recovery operating system may be stored in one or more blocks that are also data protected. In one embodiment, the BIOS may be stored in two 128 kilobyte blocks and the recovery operating system may use two 128 kilobyte blocks. The remainder of the memory may be utilized to store the primary operating system and a file system. Additional information about FLASH memories may be found in the "FLASH Memory" Databooks, January 1998, Order No. 2108830-017 available from Intel Corporation, Santa Clara, Calif.

Figure 2:
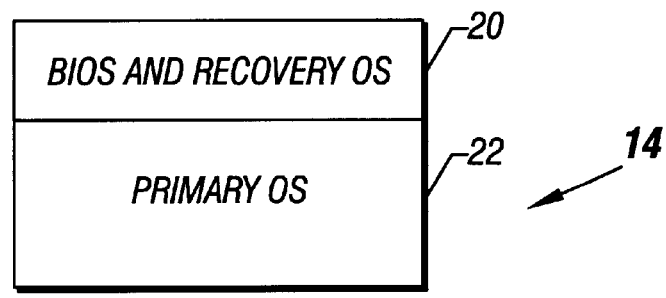
FIG. 2 is a depiction of the memory architecture of the storage device shown in FIG. 1.

Referring now to FIG. 2, the memory architecture of the storage device 14 may include addressable locations for a BIOS and recovery operating system 20 and a primary operating system 22. The primary operating system may be an open operating system such as Microsoft Windows® 98 or CE, Linux, or the Be operating systems, as examples. The primary operating system may also be a real time operating system (RTOS) such as the PalmOS. The BIOS and recovery operating system 20 operates in cases where the primary operating system 22 is corrupted or needs updating. The recovery operating system 20 may be an operating system of a reduced size which includes basic, essential BIOS functions and the limited software needed to obtain a new primary operating system. Thus, as used herein a "recovery operating system" is an operating system that is responsible for updating and/or obtaining a replacement for a primary operating system.

Figure 3:
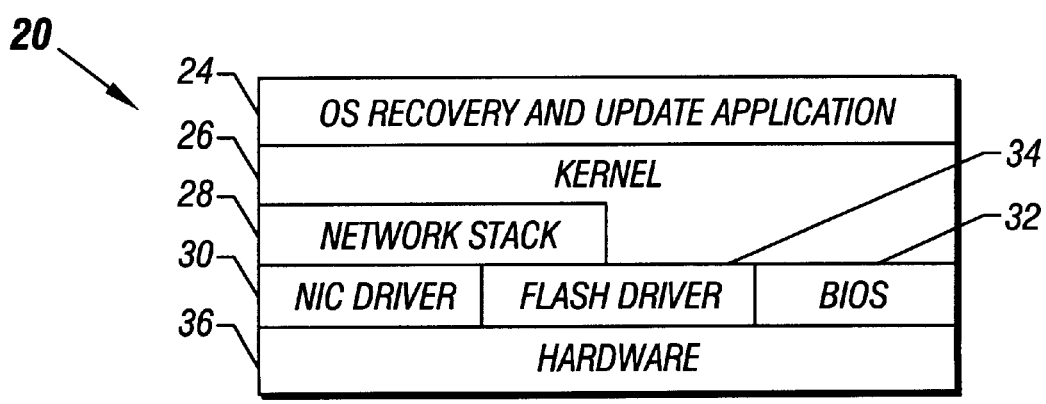
FIG. 3 is a depiction of a memory architecture of a BIOS and recovery operating system used in the system shown in FIG. 2.

Referring to FIG. 3, in one embodiment of the invention, the recovery operating system 20 includes a kernel 26, a network interface controller (NIC) drivers 30 and a network stack 28. The kernel 26 is the core of the recovery operating system 20. The stack 28, for example, may include the User Datagram Protocol/Internet Protocol (UDP/IP), Trivial File Transfer Protocol (TFTP), Dynamic Host Control Protocol (DHCP), Address Resolution Protocol (ARP) and the boot strap protocol (BOOTP). (These protocols may be found at www.ietf.org/rfc.html.) The recovery operating system 20 may also include the operating system recovery and update application software 24. A FLASH driver 34 and BIOS services 35 may also be included. The FLASH driver is used to write a new primary operating system to the FLASH memory, where a FLASH memory is used as the storage device 14. The hardware interface 36 interfaces the software layers with a hardware motherboard.

Ideally, the recovery operating system 22 may be stripped down as much as possible to conserve memory. If possible, the kernel 26 may be reduced to only that code which is necessary to implement its recovery and update functions. One kernel which is particularly applicable is the LINUX kernel. The LINUX kernel includes an X-based kernel configuration utility called make xconfig. This utility provides a graphical user interface to facilitate selecting the elements of the kernel and the operating system. That is, the LINUX operating system allows the user to answer a series of questions, posed through a graphical user interface, indicating whether particular functionalities are desired. The code for de-selected functionalities may then be excluded. As a result, a relatively trimmed down operating system may be readily developed, without access to object code.

In the case of some software errors or crashes, the system may reboot, thereby resolving the error. A watchdog timer in the CMOS memory keeps a count of unsuccessful attempted reboots. If that number exceeds a threshold level (e.g. three), the recovery operating system may be invoked. When the system attempts to reboot, it checks the CMOS memory re-boot count and automatically boots the recovery operating system if the re-boot count threshold is exceeded. The recovery operating system 20 is started so that a new version of the primary operating system image may be fetched.

The recovery operating system 20 may also acquire operating system updates. This may be done in a number of ways. In one embodiment, the user may request an update, thereby setting a separate update bit in the CMOS memory. In another embodiment, an operating system provider may broadcast a message to its users indicating that an update is available. The user systems that receive the message may have their update bit automatically set in CMOS memory. On the next attempted boot, the recovery operating system is booted to automatically acquire the update.

Alternatively, the recovery and update application software 24 may be configured so that the update is automatically acquired at a predicted low usage time. For example, if the system detects that the update bit is set, indicating an update is desired, the system may wait until the middle of the night to automatically download the update.

The recovery operating system in turn may communicate through the network interface controller and the network 16 to fetch a new version of the primary operating system image. This may be done by accessing another device in the same network or in another example, accessing the desired operating system over the Internet.

After the new operating system has been checked in system memory and loaded into the memory 14, the system is rebooted. When the system reboots the primary operating system, the primary operating system resets the update bit in CMOS memory.

In some cases when booting is attempted, an analysis of the stored operating system may determine that the operating system is corrupted. For example, during booting a checksum analysis may be undertaken. If the stored operating system is corrupted, a recovery bit may be set in the CMOS memory and the boot aborted. The next time a boot is attempted, the recovery bit is identified, and the system boots to the recovery operating system.

Figure 4:
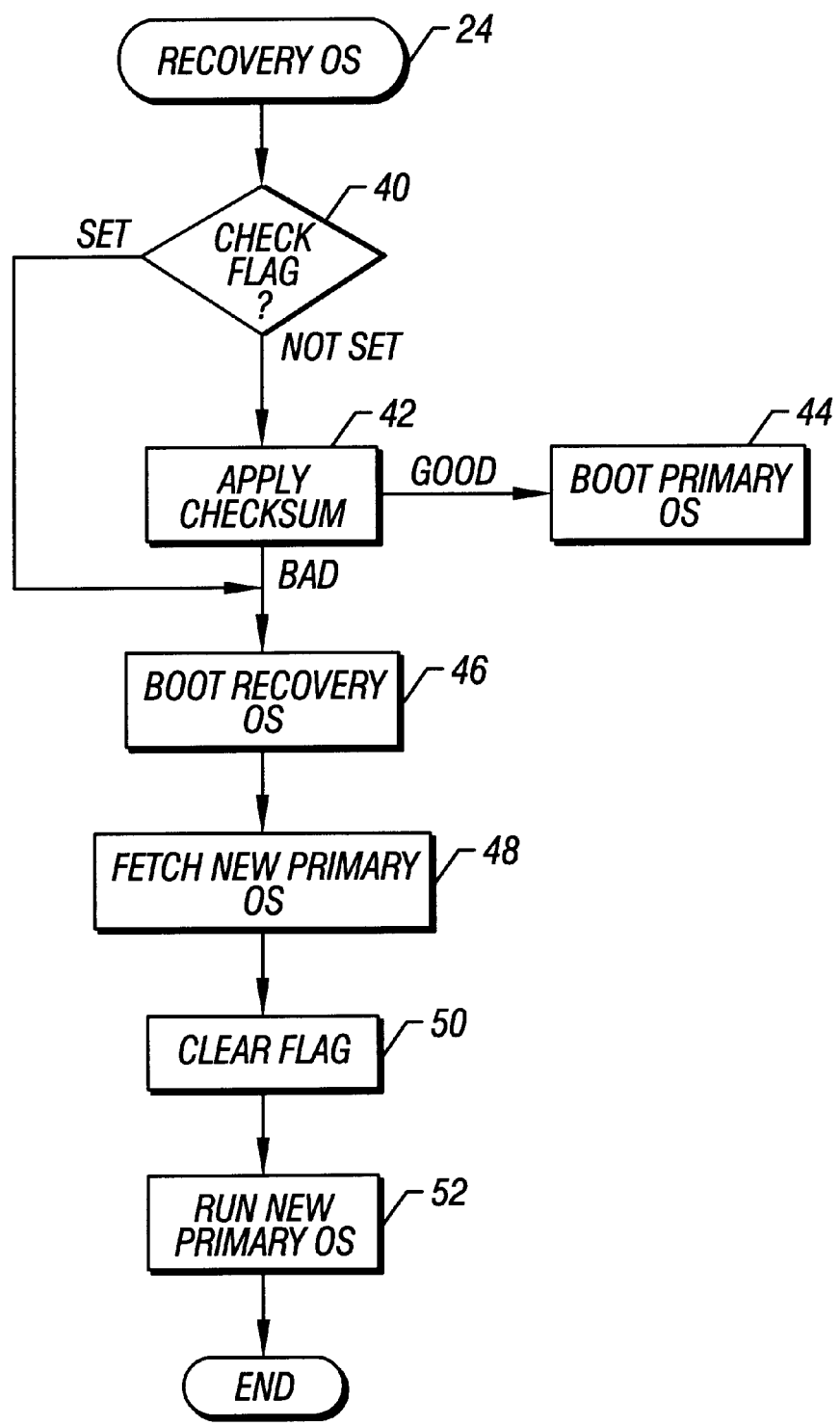
FIG. 4 is a flow chart for implementing software for re-loading operating systems in accordance with one embodiment of the present invention.

Referring now to FIG. 4, recovery and update application software 24 begins by checking the storage device 14 as indicated in diamond 40. Upon power up, after going through the power on self test (POST), the start-up code checks the primary operating system image in the memory 14 for checksum errors. If there is an error, the system boots the recovery operating system 20 and launches the recovery application. An error code may arise because the operating system image is corrupted or one of the recovery or update flags are set. The recovery flag may be set, for example, because of a defect in the operating system. The update flags may be set, for example, because a time period has elapsed for an old primary operating system or because the user has indicated a desire to obtain an upgrade. Thus, after applying the checksum as indicated in block 42, the primary operating system is booted as indicated in block 44 if the checksum indicates a valid operating system. Otherwise, the recovery operating system is booted as indicated in block 46.

During the boot routine, start-up code which is part of the BIOS, sets the recovery bit in the CMOS memory if appropriate. The start-up code may also include the code for counting the number of times a reboot has been attempted and for storing information about the number of attempted reboots.

The application 24 may initiate a request over the network to the server 18 for an operating system download (block 48), in one embodiment of the present invention. Once the new image is downloaded, it is written to the storage device 14. The recovery bit is then cleared, as indicated in block 50, and the system reboots as indicated in block 52. The next time through, the system boots into the primary operating system and performs it usual functions.

Figure 5:
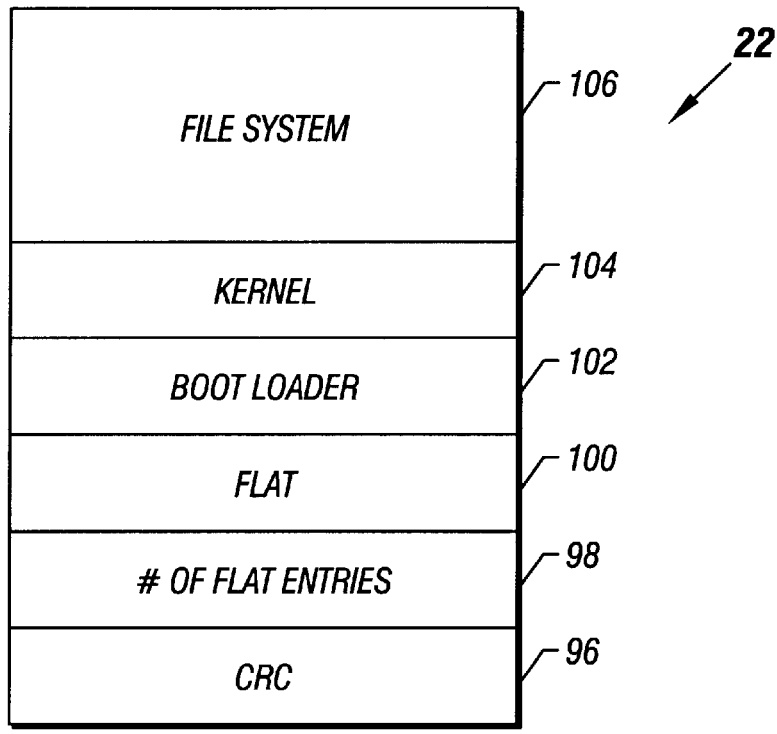
FIG. 5 is a depiction of a memory architecture for the primary operating system shown in FIG. 2.

The memory architecture of a portion of the storage device 14 storing the primary operating system 22, shown in FIG. 5, has, at the lowest memory address, a checksum or cyclic redundancy check (CRC) field 96. Above the checksum field 96 is a field 98 which indicates the number of entries in a FLASH allocation table (FLAT) 100. The FLASH allocation table partitions the FLASH memory portion 22 and allows multiple code and data images to be stored in the storage device 14. This in turn allows multiple boot loaders to exist within the FLASH memory for booting different operating system images. At boot time, the BIOS selects which boot loader to load and execute based on the status of the recovery bit, as described above.

The boot loader 102 for loading the primary operating system is stored above the FLASH allocation table 100. Above the boot loader 102 is the kernel 104 or core of the primary operating system. The primary operating system kernel may be the same or different from the kernel utilized by the recovery operating system. For example, while LINUX may be used for the recovery operating system, Windows® CE could be used in one embodiment for the primary operating system.

Above the kernel 104 is a file system 106. The FLASH allocation table 100 includes one entry for each item stored in the FLASH memory portion 22 including the items stored in the file system 106. The file system 106 includes files, directories and information used to locate and access operating system files and directories.

Each item contained in the FLASH allocation table includes information about the software version, the flags, the data offsets, the length of the data and its load address. The version number just keeps track of which version of software was loaded in a particular memory 14. The data offset determines where, in the FLASH memory, an entry is located.

The flag field has information about the nature of the respective entries. The least significant bit of the flag field includes information about the status of the cyclic recovery check (CRC). This in effect tells the BIOS whether a CRC must be calculated. The next most significant bit includes the block type. The block types include "boot" which indicates a boot loader, "kernel" or "file system". If the block type is boot loader, this flag field tells where, in random access memory, to load the boot loader out of the FLASH memory. An additional area in the flag field may be reserved for other information. A boot loader or bootstrap loader loads and passes control to another loader program which loads an operating system.

Figure 6:
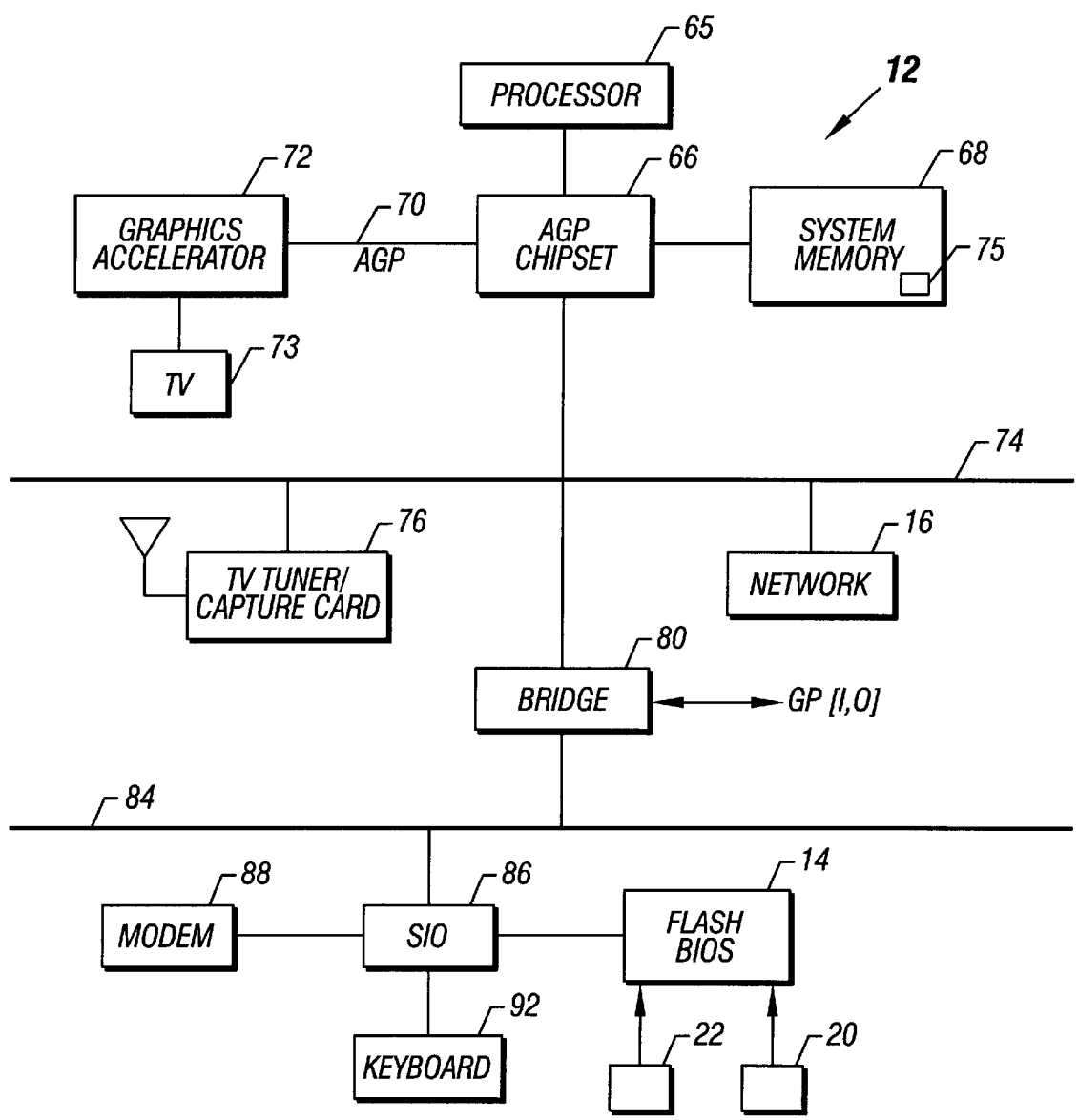
FIG. 6 is a hardware implementation of the client shown in FIG. 1.

While the present invention may be used in connection with a variety of processor-based systems, an application which uses a set top computer system is illustrated in FIG. 6. A set top computer systems works with a television receiver. The client 12 may include a processor 65 coupled to an accelerated graphic board (AGP) chipset 66. The Accelerated Graphic Port Specification, Rev. 2.0 is available from Intel Corporation of Santa Clara, Calif. The chipset 66 may be coupled to system memory 68 in the accelerated graphics port bus 70. The bus 70 in turn may be coupled to a graphic accelerator 72, also coupled to a video or television receiver 73.

A portion 75 of system memory 68, called the CMOS memory, may be implemented by a memory integrated circuit which is adapted to save system data. Conventionally, the CMOS includes the real time clock (RTC), which keeps the time of day. The recovery and update bits are stored in the CMOS memory at predefined locations.

The chipset 66 may also be coupled to a bus 74 that receives a television tuner/capture card 76. The card 76 may be coupled to a television antenna 78 which may also be a satellite antenna or a cable connection as additional examples. An interface to a network 16, such as a modem interface connection to the Internet or a network interface controller connection to a computer network may also be provided.

A bridge 80 may in turn be coupled to another bus 84 which supports a serial input/output interface 86 and a memory interface 94. The interface 86 may be coupled to a modem 88 or a keyboard 92. The interface 94 may couple the FLASH memory 14 storing the recovery operating system and BIOS 20 and the primary operating system 22. The bridge 80 may be the 82371AB PCI ISA IDE Xcelerator (PIIX4) chipset available from Intel Corporation. Thus, it may include a general purpose input/output pins (GP[I,O]).

With the number of chipsets used to implement computer systems, the chipset may be set up so that it sees only a certain number of lines of BIOS at any one time. In embodiments in which the primary operating system and the recovery operating system are stored in FLASH memory, they may be accessed in the same way as the BIOS memory is accessed. Thus, since the FLASH memory that is accessed is considerably larger than a BIOS memory, it may be desirable to use other techniques to allow accessing all of the memory stored in the FLASH. One technique for doing this in processors from Intel Corporation is to use the GP[I,O] pins, for example on the PIIX4 device. These pins can be coupled to the pins responsible for developing the signals reading the BIOS. By providing appropriate GP[I,O] signals, FLASH memory reading may be bank switched to sequentially read the entire memory.

Figure 7:
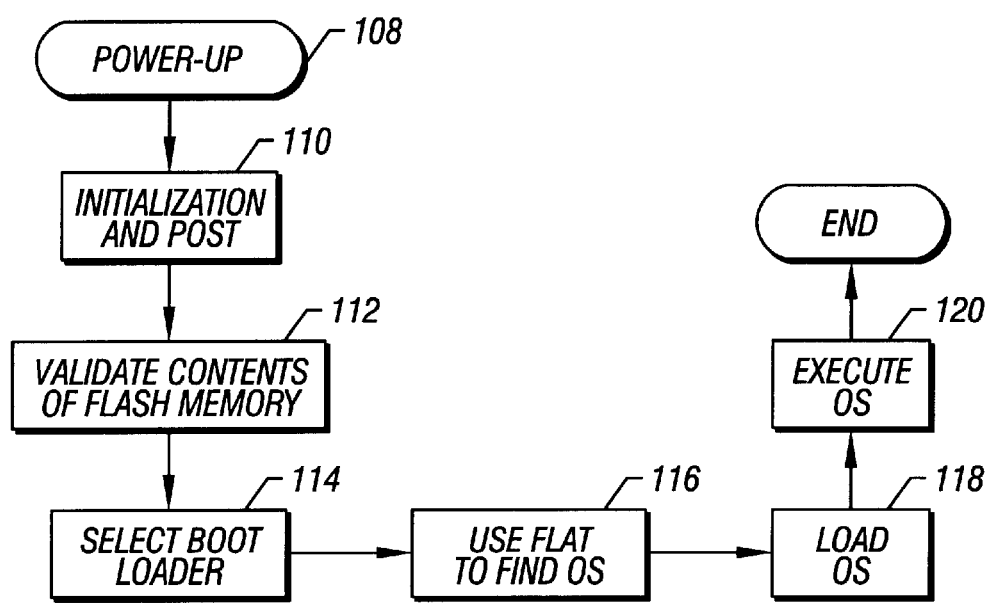
FIG. 7 is a flow chart illustrating the operation of the FLAT shown in FIG. 5.

Turning now to FIG. 7, in accordance with one embodiment, software that uses the FLAT to allow multiple code and data images to be stored in FLASH memory, begins on power up or system reset with the BIOS executing and performing system initialization and Power on Self Test activities (block 110). The contents of the FLASH memory may be validated by checking the CRC stored at field 96 in the FLASH memory, as indicated in block 112. At this point, the BIOS selects the boot loader (block 114) to execute by scanning the FLAT and selecting the entry marked as the boot loader. The boot loader then uses the FLAT to find where in the FLASH memory the primary operating system is located (block 116), loads the operating system at the appropriate address in system memory (block 118) and starts its execution (block 120).

In some embodiments the BIOS may continue to be independent from the operating system. The operating system dependencies can reside in the boot loader. The boot loader allows a conventional computer operating system to reside in FLASH memory.

While the present invention has been illustrated in connection with an embodiment wherein the primary operating system and the recovery operating system are stored in a storage device such as a FLASH memory, other reprogrammable storage devices may be utilized as well. In the case of FLASH memory, given current economies, the memory is relatively expensive and mirroring is generally not used. Thus, the use of the recovery operating system in connection with FLASH memories is particularly advantageous.

However, the present invention may be utilized in connection with other configurations. For example, in systems that store the primary operating system in a hard disk drive, the recovery operating system may also be included on the hard disk drive. The BIOS may continue to be stored in a BIOS ROM in such cases, if desired.

Alternatively, the recovery operating system may actually be provided on an external or removable memory, such as a compact disc ROM (CD-ROM). When necessary, the user may simply load the CD-ROM into a CD-player. A processor executes the recovery operating system off of the CD-ROM, and then uses the recovery and update application software to update and replace the primary operating system. This approach offers advantages over providing the full operating system in disk form since the use of a compact recovery operating system facilitates updates. That is, the compact recovery system may be quickly loaded and used to acquire updates. Otherwise, a full operating system would need to be provided in disk form to each user, for each update, so that the user can then acquire the updates.

In addition, while the present invention has been described with respect to a client/server environment, the present invention is available to a variety of other environments. For example, the present invention may be implemented on a server in a client/server environment. In addition, it is applicable to stand-alone computer systems including processor-based systems that are battery powered. For example, in connection with hand-held computer systems, the present invention may provide an update or replacement functionality using available wired or wireless communication links. In a system which may be temporarily hard wire linked to a desktop computer, such as a PalmPilot personal digital assistant, the recovery operating system may communicate with the desktop to obtain a new operating system. Similarly, upgrades may be obtained using a variety of wireless communication links including radio and cellular telephone links. Moreover, in systems which are linked through cable or satellite broadcast systems, new operating systems may be achieved using these communication links as well.

In connection with custom operating systems, it may be necessary to go to a specific remote location in order to update or replace the operating system. However, in connection with non-custom operating systems, a variety of sites within the user's extended computer system, accessible over the Internet or over a variety of communication links, may be utilized to acquire such replacements. In addition, a plurality of such sites may be preprogrammed into the recovery operating system application software so that if the system is unsuccessful in acquiring the needed replacement at one location, it can query a plurality of other locations.

In some cases, the recovery application software can not be programmed with information about additional locations which contain future updates. However, when an operating system provider broadcasts information about updates, that broadcast may also include information about how to automatically acquire the desired updates. This information may then be used by the recovery application software.

In some embodiments, the system user is oblivious to the operation of the recovery operating system. The recovery operating system works in the background making the primary operating system to appear to the user to be more robust.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A memory comprising:

a first portion storing a primary operating system; and a second portion storing a recovery operating system and instructions adapted to obtain a new operating system from outside said memory.

2. A memory comprising:

a first portion storing a primary operating system;

a second portion storing a recovery operating system and instructions adapted to obtain a new operating system from outside said memory; and wherein said memory is a FLASH memory.

3. The memory of claim 2 further storing the basic input/output system.

4. The memory of claim 2 wherein the kernel for said recovery operating system is smaller than the kernel for said primary operating system.

5. A processor-based system comprising:

a microprocessor; and a reprogrammable memory coupled to said microprocessor, said reprogrammable memory storing a primary operating system and a recovery operating system adapted to obtain a new operating system from outside said processor-based system.

6. A processor-based system comprising:

a microprocessor;

a reprogrammable memory coupled to said microprocessor, said reprogrammable memory storing a primary operating system and a recovery operating system adapted to obtain a new operating system from outside said processor-based system; and a system memory and a FLASH memory storing said primary operating system and said recovery operating system.

7. The processor-based system of claim 6 wherein said FLASH memory also stores the basic input/output system.

8. The processor-based system of claim 7 further storing an application program adapted to obtain a new primary operating system by accessing a network.

* * * * *